Patented July 30, 1946

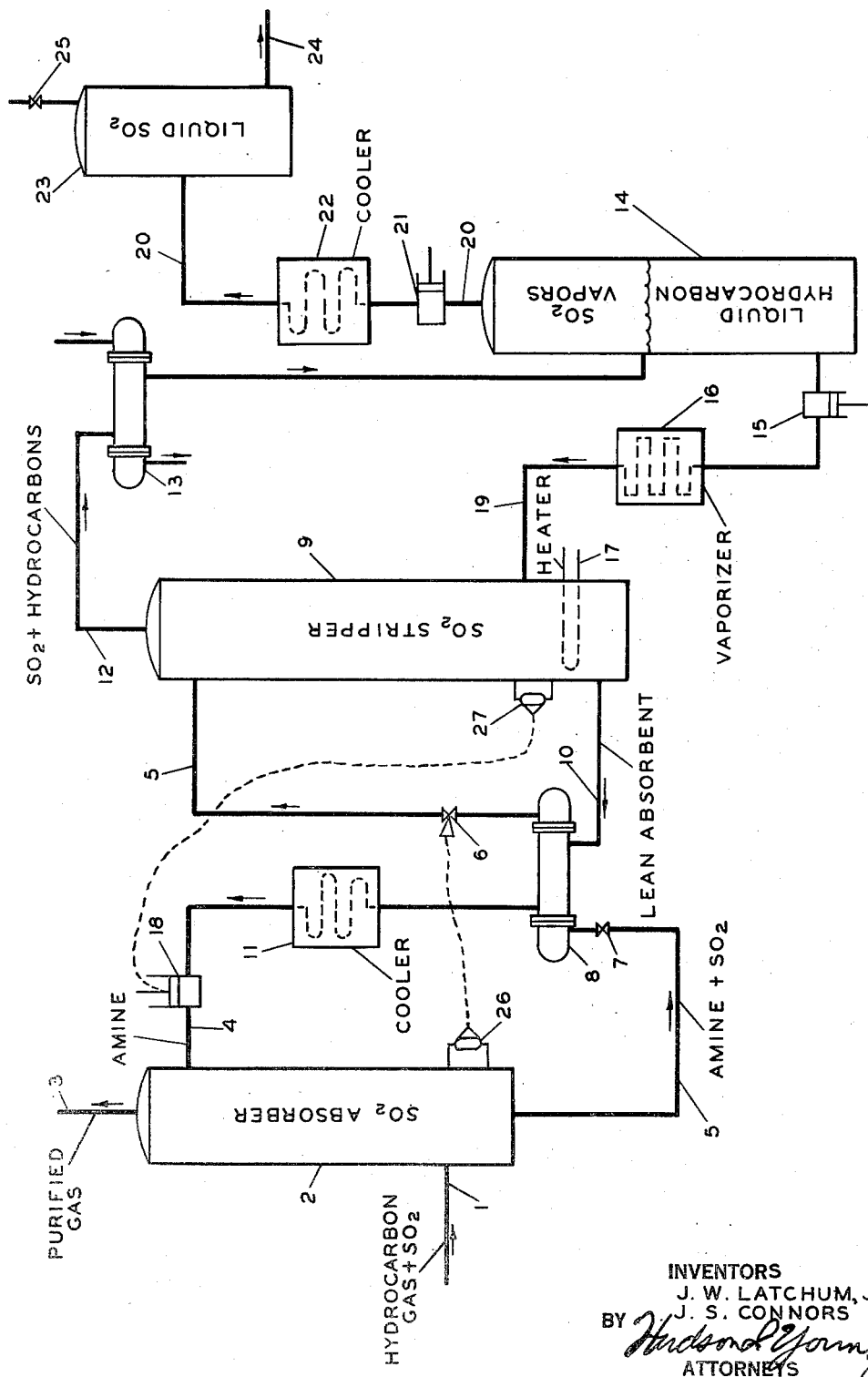

2,404,854

UNITED STATES PATENT OFFICE 2,404,854

REGENERATION OF ABSORBENT

John W. Latchum, Jr., and James S. Connors, Bartlesville, Okla., assignors to Phillips Petroleum Company, a corporation of Delaware Application December 18, 1944, Serial No. 568,767

15 Claims. (Cl. 23—3)

This invention relates to a method for the treatment of amine solutions used for the removal of acidic gases from gaseous mixtures. In one of its more specific aspects it relates to a new and useful method for the regeneration of amine solutions which contain absorbed acidic gases.

An efficient and easily operative method for the removal of acidic gases from gaseous mixtures containing such gases is to treat or contact the gaseous mixture with a chemical reagent such as the ethanolamines, for example, diethanolamine, or such other amine as xylidine, which possesses properties suitable for the purpose at hand. These amines combine with the acidic gases, common examples of which are, sulfur dioxide, carbon dioxide, and hydrogen sulfide, to form a sort of "loose" compound or a compound which can be easily decomposed for regeneration purposes. In case such compounds are consumed during the gas removal operations, cost usually prohibits their use, hence the utility of the regeneratable amines.

The conventional method for the removal of acidic gases from or the "regeneration" of such amine solutions is to strip the absorbed material by introducing open or live steam into the amine solution in a stripping still. Such a procedure inevitably involves introduction of moisture in the gases recovered from the stripping steam. In case a dry product of $H_2S$, $SO_2$ or even $CO_2$ is desired to be produced then steam stripping cannot be used or the separated gases must be treated in a costly drying or dehydrating system.

We have found a method wherein acidic gases can be stripped from absorbent amine solutions in a dry or moisture-free condition suitable for marketing as dry gases or even for use in cyclic processes requiring "dry" reagents. Our process is especially valuable when used in conjunction with a process for the removal of nitrogen gas from hydrocarbon gases by extraction with a solvent such as liquid sulfur dioxide. In a process of this nature the treated hydrocarbon gas usually contains some sulfur dioxide gas and it is obviously necessary to remove this acidic gas before marketing the nitrogen-free hydrocarbon. And the sulfur dioxide during its extraction and recovery must be maintained in a dry condition or dried if moist, and suitable drying processes are frequently costly to construct and operate. By our process, we are able to extract and recover sulfur dioxide in a dry condition so that subsequent drying steps are unnecessary.

Sulfur dioxide which contains moisture becomes corrosive to ordinary plant equipment and under certain conditions the moisture may freeze thereby causing operational difficulties.

An object of our invention is to provide a process for the removal of acidic gases from amine absorbents containing such gases in combination with the amines.

Another object of our invention is to provide a process for the removal of acidic gases from amine absorbents wherein the acidic gases are maintained in a dry condition, that is, free of moisture.

Still another object of our invention is to furnish a unitary process for the removal of an acidic gas such as sulfur dioxide, from a hydrocarbon gaseous mixture by extraction with an amine solution, separating the acidic gas from the amine solution, both these latter materials being kept in a fully dry condition, recycling the amine into the process and recovering the acidic gas.

Still other objects and advantages of our invention will be apparent to those skilled in such art from a careful study of the following description, which taken in conjunction with the attached drawing, forms a part of this specification.

The drawing shows, diagrammatically, one form of apparatus in which the process of our invention may be practiced.

Our invention has a broad application; for example, it is adapted to the removal of sulfur dioxide from hydrocarbon gas by absorption in an amine solution, and the recovery of the sulfur dioxide in a thoroughly dry condition; it is also applicable to the removal of hyrrogen sulfide or even carbon dioxide from such a gas by amine absorption and recovery of dry hydrogen sulfide or carbon dioxide. These acidic gases may likewise be extracted from such other gases than hydrocarbon gases, as for example, nitrogen, hydrogen, or other gas which does not react chemically with materials in process. In addition our process produces a regenerated amine extractant in a fully "dry" condition suitable for recycling in the process.

Our invention comprises, in particular, the use of a hydrocarbon fraction boiling substantially below the boiling point of the particular amine extractant used as an internal stripping-refluxing agent. For example, when using diethanolamine, boiling point about 514° F., we prefer to use a hydrocarbon fraction boiling from about 160° to 275° F. We have found that by using such a stripping-refluxing agent the acidic gas product and the amine solution are easily maintained in a substantially dry condition. In case a recovered sulfur dioxide material is recycled into a refrigeration step, such drying is, obviously, imperative.

Referring now to the drawing an absorber tower 2 is so designed as to promote intimate and countercurrent liquid-gas contacting. To this vessel is connected a gas inlet line 1, a gas outlet line 3, liquid inlet and outlet lines 4 and 5, respectively. Line 5 carries two pressure reducing valves, 6 and 7, and a heat exchanger 8.

A stripping vessel 9 is equipped with a liquid inlet line which is a continuation of the line 5 from vessel 2, a liquid outlet line 10 which connects to the above mentioned line 4 through a heat exchanger 8. A pump 18 is in liquid-liquid communication with line 10. A heat exchanger 11 is inserted in the line 4. The stripper carries a gas outlet line 12, a stripping agent inlet line 19 and a closed heater coil 17. The overhead gas outlet line 12 carries a heat exchanger 13 while the line 19 carries in addition to a heat exchanger 16, a pump 15. The lines 12 and 19 connect the stripper 9 with an accumulator vessel 14 which in turn has gas outlet line 20. This line carries a compressor or transfer pump 21, and a heat exchanger 22, and further connects with a storage vessel 23, which in turn has a relief valve 25 and an outlet line 24.

In the operation of our process, a hydrocarbon gas containing an acidic gas, for example, sulfur dioxide, enters the lower portion of the absorber 2 through a gas inlet line 1. This gas may enter the absorber at most any pressure desired. In case the gas comes from a field line the pressure may be fairly high, or in case a high pressure field gas passes through a high pressure treating stage or two, the inlet pressure to the absorber may still be fairly high. In any event, we prefer to use a substantial pressure in order to keep at as low a figure the volume of gas to be treated so that the absorber vessel 2 may be as small as possible, or that the treated gas may be delivered subsequently to a high pressure pipeline or to other disposal with lower recompression costs. Obviously, however, there will be an optimum balance between the pressure and economic size of the vessel, which balance may be well determined by the design engineer when planning the plant. However, if desired, the gas may be treated or contacted by the amine at atmospheric pressure, since the absorption of an acidic gas by our amine is a chemical combination or reaction rather than a mere dissolving or physical solution.

For our purpose and example, we will describe our process as based on a gas absorption pressure of approximately 700 pounds per square inch absolute. In all pressures mentioned herein, it is to be understood that they are in pounds per square inch absolute, unless otherwise specified.

Accordingly, the hydrocarbon-sulfur dioxide gas mixture enters the absorber 2 through said line 1 at the pressure of about 700 pounds per square inch absolute. The column 2 may be a bubble cap type column, or a packed column, or substantially any type column providing it be adapted to promote efficient contacting between gas and liquid at the pressure desired. The amine solution, such as liquid diethanolamine, enters the column through the line 4 at the pressure within the vessel, and passes downward in countercurrent relation to the ascending hydrocarbon-sulfur dioxide gases being treated. The treated gas, that is, hydrocarbon gas free of acidic gas, issues from the absorber through the overhead gas line 3 to such disposal as desired.

The exemplary pressure within the absorber 2 as mentioned above, is taken at about 700 pounds, and the temperature of contacting may be substantially atmospheric. For purposes of full disclosure, the contacting in the absorber may be carried out at temperatures considerably below 90°, as for example, in wintertime in cold climates, it may be preferable to carry out the absorption step at as low a temperature as 50° or 60° F. Similarly, in hot weather, temperatures of 110° or even 120° F. are operable. The limiting factor in this respect is that the higher the temperature of contacting, the greater is the volume of absorbent needed to extract a given volume of sulfur dioxide gas.

Amine absorbent charged with acidic gas issues from the absorber through the rich absorbent outlet line 5 and passes through one or more pressure reducing valves 6 and 7 and exchange heater 8 and enters the stripper column or vessel 9 at a point near the top thereof. On passing these pressure reductions the pressure is dropped to about 25 pounds per square inch which is the approximate stripper operating pressure. In the operation of these pressure reducing valves, we prefer to do substantially all the pressure reducing previous to the heating step since the utilization of the hot stripped amine from the base of the stripper will be more efficient in the exchanger 8. It may, however, still be necessary to install and use a supplemental heater in line 5 to make certain that the rich absorbent is heated to about 160° F. by the time it enters the stripper.

Lean amine absorbent is transferred from stripper 9 through line 10, exchanger 8, cooler 11 and line 4 to the top of the absorber by the transfer pressure pump 18. This pump removes the absorbent at an absolute pressure of about 25 pounds and delivers the cooled absorbent to the absorber at about 700 pounds pressure. The operation of pump 18 is controlled by the liquid level controller apparatus 27. Liquid level controller 26 makes certain that a certain minimum volume of absorbent is maintained in the base of the absorber.

Hot, lean absorbent is the best exchange medium used in exchanger 8 while supplemental cooling is imparted to the lean absorbent in cooler 11 to make certain that the lean absorbent is properly cooled before passing into the absorber. Water may be the cooling agent in this latter cooler, if desired.

As mentioned above, the temperature of the rich absorbent entering the stripper is maintained at about 160° F. The heater or reboiler coil 17 is intended to maintain a stripper kettle temperature of about 275° F.

To improve the acidic gas, for example $SO_2$, stripping operation we have found if a hydrocarbon fraction having a boiling range of from approximately 160° to 275° F. is introduced into the base of the stripper as a vapor that the removal of the sulfur dioxide or other acidic gas is markedly facilitated. These hot hydrocarbon vapors rise up the stripper and on condensing in the cooler rich absorbent impart heat of condensation which in turn heats the amine-$SO_2$ solution and assists in removal of the $SO_2$. The thus condensed hydrocarbon then flows down the stripper and is again vaporized in the kettle thereof by the reboiler 17 and the hot vapors again rise to condense and liberate additional SO₂. This operation is a type of internal refluxing.

During this continuous and cyclic stripping operation some of the hydrocarbon vapors are carried from the stripper with the stream of acidic gas. These vapors pass from the stripper by way of the gas line 12 and pass through a condenser 13 which imparts sufficient cooling to condense the hydrocarbons but not the acidic gas. Condensed hydrocarbons and acidic gas become separated in the separator or accumulator tank 14, the hydrocarbons being withdrawn by pump 15 and passed through line 19 and vaporizer 16 wherein the hydrocarbons are vaporized. These vapors then continue on through line 19 into the base of the stripper 9 to complete this hydrocarbon cycle.

The acid gas or our exemplary SO₂ is withdrawn from the accumulator 14 by pump 21 and passed through line 20, condenser 22, the condensate accumulating in vessel 23. The SO₂ may be withdrawn as liquid through line 24 to such disposal as may be desired, or if it is not desired to condense the SO₂ in cooler 22, the gas may just be further cooled and accumulated in vessel 23 as a gas, and the gas disposed of through line 24 as desired. Relief valve 25 is provided as a safety measure.

The particular hydrocarbon fraction which we have used in our above described example was merely taken as an example since the boiling range thereof may be varied considerably and yet produce the same desired results. The important point to be considered in the selection of a hydrocarbon fraction is to be certain that the maximum boiling point is considerably below the boiling point of the amine absorbent. In case diethanolamine is used as the absorbent, whose boiling point is 514° F., then we prefer to use such an internal reflux agent as a paraffinic hydrocarbon boiling from about 160° to 275° F. This maximum boiling temperature should be considerably below the boiling point of the absorbent in order to minimize or prevent vaporization and carryover of amine vapors with the overhead stripper gas. If amine vapors are carried over, then upon condensation in cooler 13 the amine and some SO₂ recombine, and thus SO₂ is returned to the stripper in the hydrocarbon line 19 thus throwing an overload on the stripper. Amine absorbents having lower boiling points and accordingly lower vapor pressures at temperatures below the boiling point will require accordingly lower boiling hydrocarbons as the internal stripper, while conversely an amine having an accordingly lower vapor pressure and/or higher boiling point may permit the use of a higher boiling range hydrocarbon fraction and yet permit substantially no amine carryover from the stripper.

In the description of the operation of our process we have omitted reference to many pieces of apparatus which would be used in practice, for purposes of simplicity. Such auxiliary equipment includes flow controllers, temperature measuring and recording devices, valves, meters, pressure gauges, and many others. Such apparatus, the operation and purpose of which are well understood by those skilled in such art, will of course be included in plant designs.

The materials of construction for a plant in which to practice our invention are more or less standard and may well be selected from those commercially available for the problem at hand.

Thus it will be seen that our invention is of a broad scope and is applicable to the removal of acidic gases from such relatively inert gases as hydrocarbons, hydrogen, nitrogen, etc. The operation of our process may be varied within wide limits and yet remain within the intended spirit and scope of our invention.

When the rich amine solution, that is, amine-SO₂ absorbent is dry, we are then able to remove the SO₂ as a dry product leaving the absorbent also completely dry. As mentioned hereinbefore, ordinarily open steam stripping is used to remove SO₂ or other acidic gas from such an absorbent and this operation produces a wet or moisture containing acidic gas. Thus, by using our internal reflux with "closed" reboiler coils we are able to produce a dry acidic gas as well as a fully dry lean absorbent.

When the rich amine absorbent contains moisture or dissolved water, our dry internal refluxing causes this moisture content to pass overhead of the stripper 9 with the acidic gas-hydrocarbon stream. In such a case the stripped amine absorbent issues from the stripper in a thoroughly dried condition while the acidic gas contains the moisture. When a dry acidic gas is desired, it must, of course, be subsequently dried.

While we have disclosed our invention in connection with an absorption step wherein an acidic gas contained as one component of a gaseous mixture was contacted with an amine solution to produce the rich absorbent, we do not wish to be limited to treatment of gaseous mixtures since the rich amine absorbent may result from treatment of liquids containing acidic gases in solution or from other source.

We claim:

1. A process for separating acidic gas from gaseous mixtures containing same comprising the steps of contacting the gaseous mixture with an amine absorbent, separating the gaseous mixture from the absorbent and removing the gaseous mixture as a purified gaseous product of the process; passing the contacted absorbent as rich absorbent into a stripping zone having an inlet end and an outlet end with respect to absorbent flow, passing hydrocarbon into the outlet end and removing acidic gas from the inlet end of said stripping zone, removing stripped absorbent from the outlet end of the stripping zone and recycling this stripped absorbent into the original contacting step as the amine absorbent; and removing said acidic gas as a second product of the process.

2. A process for separating acidic gas from gaseous mixtures containing same comprising the steps of contacting the gaseous mixture with a diethanolamine absorbent, separating the gaseous mixture from the absorbent and removing the gaseous mixture as a purified gaseous product of the process substantially free of acidic gas; passing the contacted absorbent as rich absorbent into a stripping zone having an inlet end and an outlet end with respect to absorbent flow, passing hydrocarbon into the outlet end and removing acidic gas and hydrocarbon from the inlet end of said stripping zone, removing stripped absorbent from the outlet end of the stripping zone and recycling this stripped absorbent into the original contacting step as the diethanolamine absorbent; separating the acidic gas and hydrocarbon, removing the acidic gas as a second product of the process and recycling the hydrocarbon as the above said hydrocarbon into the outlet end of said stripping zone.

3. A process for separating acidic gas from gaseous mixtures containing same comprising the steps of contacting the gaseous mixture with a xylidine absorbent, separating the gaseous mixture from the absorbent and removing the gaseous mixture as a purified gaseous product of the process substantially free of acidic gas; passing the contacted absorbent as rich absorbent into a stripping zone having an inlet end and an outlet end with respect to absorbent flow, passing hydrocarbon into the outlet end and removing acidic gas and hydrocarbon from the inlet end of said stripping zone, removing stripped absorbent from the outlet end of the stripping zone and recycling this stripped absorbent into the original contacting step as the xylidine absorbent; separating the acidic gas and hydrocarbon, removing the acidic gas as a second product of the process and recycling the hydrocarbon as the above said hydrocarbon into the outlet end of said stripping zone.

4. A process for separating acidic gas from hydrocarbon gas containing same comprising the steps of contacting the hydrocarbon gas with a diethanolamine absorbent, separating the contacted hydrocarbon gas from the absorbent and removing said gas as a product of the process substantially free of acidic gas; passing the contacted absorbent as rich absorbent into a stripping zone having an inlet end and an outlet end with respect to absorbent flow, passing normally liquid hydrocarbon into the outlet end and removing acidic gas and normally liquid hydrocarbons from the inlet end of said stripping zone, removing stripped absorbent from the outlet end of the stripping zone and recycling this stripped absorbent into the original contacting step as the diethanolamine absorbent; separating the acidic gas and the normally liquid hydrocarbon, removing the acidic gas as a second product of the process and recycling the normally liquid hydrocarbon as the above said normally liquid hydrocarbon into the outlet end of said stripping zone.

5. A process for separating sulfur dioxide from hydrocarbon gas containing same comprising the steps of contacting the hydrocarbon gas with a diethanolamine absorbent, separating the contacted hydrocarbon gas from the absorbent and removing said gas as one product of the process substantially free of sulfur dioxide; passing the contacted absorbent as rich absorbent into a stripping zone having an inlet end and an outlet end with respect to absorbent flow, passing a vaporous normally liquid hydrocarbon fraction into the outlet end and removing sulfur dioxide and vaporous normally liquid hydrocarbon fraction from the inlet end of said stripping zone, removing stripped absorbent from said oulet end and recycling this stripped absorbent into the original contacting step as the diethanolamine absorbent; cooling the removed sulfur dioxide and vaporous normally liquid hydrocarbon fraction to condense the hydrocarbon therefrom and separating the sulfur dioxide from the condensate and removing said sulfur dioxide as a second product of the process; removing the condensed hydrocarbon fraction, vaporizing same and recycling into the outlet end of the stripping zone as the vaporous normally liquid hydrocarbon fraction.

6. A process as in claim 5 wherein the normally liquid hydrocarbon fraction is a paraffinic fraction boiling from about 160° to 275° F.

7. A process as in claim 5 wherein the normally liquid hydrocarbon fraction is a paraffinic fraction boiling from about 160° to 275° F. and the outlet end of the stripping zone is maintained at a temperature of about 275° F.

8. A method for stripping absorbed acidic gas from a diethanolamine absorbent containing acidic gas comprising the steps of passing the rich absorbent into the inlet end of a stripping zone having an inlet end and an outlet end with respect to absorbent flow, passing a vaporous, paraffinic hydrocarbon fraction boiling at a temperature substantially below the boiling point of the diethanolamine absorbent into the stripping zone at its outlet end, removing acidic gas and a portion of the vaporous, paraffinic hydrocarbon fraction from the inlet end of said stripping zone, separating the acidic gas from said portion of the hydrocarbon fraction and removing the acidic gas as a product of the process; and removing the diethanolamine absorbent as stripped absorbent from the outlet end of said stripping zone.

9. A method for stripping absorbed acidic gas from an amine absorbent containing acidic gas comprising the steps of passing the rich absorbent into the inlet end of a stripping zone having an inlet end and an outlet end with respect to absorbent flow, passing a vaporous, paraffinic, hydrocarbon fraction boiling at a temperature substantially below the boiling point of the amine absorbent into the stripping zone at its outlet end, removing acidic gas and a portion of the vaporous, paraffinic hydrocarbon fraction from the inlet end of said stripping zone, separating the acidic gas from said portion of the hydrocarbon fraction and removing the so separated acidic gas as a product of the process, and returning said hydrocarbon fraction to the outlet end of the stripping zone as first said vaporous fraction; and removing the amine absorbent as stripped absorbent from the outlet end of said stripping zone.

10. A method for stripping sulfur dioxide gas from a diethanolamine absorbent containing same comprising the steps of passing the rich absorbent into the inlet end of a stripping zone having an inlet end and an outlet end with respect to absorbent flow, passing a vaporous, paraffinic, hydrocarbon fraction having a boiling range substantially below the boiling point of the diethanolamine absorbent into the stripping zone at a point adjacent said outlet end, and maintaining the temperature at the outlet end of the stripping zone substantially below the boiling point of the diethanolamine absorbent and at a maximum temperature of the highest boiling constituent of said hydrocarbon fraction; removing sulfur dioxide gas and a portion of the vaporous, paraffinic hydrocarbon fraction from the inlet end of said stripping zone, separating the acidic gas from said portion of hydrocarbon fraction and removing the acidic gas as a product of the process and returning said portion of hydrocarbon fraction into the outlet end of said stripping zone as first said hydrocarbon fraction.

11. The method of claim 10 wherein the hydrocarbon fraction has a boiling range of about 160° to 275° F.

12. The method of claim 10 wherein the hydrocarbon fraction has a boiling range of about 160° to 275° F. and the inlet end and outlet end are maintained at temperatures of about 160° F. and 275° F., respectively.

13. The method of claim 10 wherein the hydrocarbon fraction has a boiling range of about 160° to 275° F. and the inlet end and outlet end are maintained at temperatures of about 160° F. and 275° F., respectively, and the stripper overhead sulfur dioxide and hydrocarbon are cooled to condense the hydrocarbon, separating the sulfur dioxide and removing same as a product of the process, removing the condensed hydrocarbon, vaporizing same and heating to approximately 275° F. and passing into the outlet end of said stripping zone as the first mentioned hydrocarbon fraction.

14. A method for stripping absorbed acidic gas from a dry diethanolamine absorbent containing acidic gas comprising the steps of passing the dry rich absorbent into the inlet end of a stripping zone having an inlet end and an outlet end with respect to absorbent flow, passing a vaporous, paraffinic hydrocarbon fraction boiling at a temperature substantially below the boiling point of the diethanolamine absorbent into the stripping zone at its outlet end, removing acidic gas and a portion of the vaporous, paraffinic hydrocarbon fraction from the inlet end of said stripping zone, separating the acidic gas from said portion of the hydrocarbon fraction and removing the acidic gas as a dry product of the process; and removing the diethanolamine absorbent as stripped dry absorbent from the outlet end of said stripping zone.

15. A method for stripping absorbed acidic gas from a diethanolamine absorbent containing acidic gas and moisture comprising the steps of passing the rich absorbent into the inlet end of a stripping zone having an inlet end and an outlet end with respect to absorbent flow, passing a vaporous paraffinic hydrocarbon fraction boiling at a temperature substantially below the boiling point of the diethanolamine absorbent into the stripping zone at its outlet end, removing acidic gas, a portion of the vaporous, paraffinic hydrocarbon fraction and moisture from the inlet end of said stripping zone, separating said portion of the hydrocarbon fraction from the acidic gas and moisture and removing these latter from the process; and removing the diethanolamine absorbent as dry, stripped absorbent from the outlet end of said stripping zone.

JOHN W. LATCHUM, Jr.
JAMES S. CONNORS.